(12) United States Patent
Meis et al.

(10) Patent No.: US 9,242,735 B1
(45) Date of Patent: Jan. 26, 2016

(54) DETECTING INFLIGHT ICING CONDITIONS ON AIRCRAFT

(71) Applicant: The Boeing Company, Huntington Beach, CA (US)

(72) Inventors: Charles S. Meis, Renton, WA (US); Erik M. Langhofer, Seattle, WA (US); Bryan D. Welsh, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 14/471,254

(22) Filed: Aug. 28, 2014

(51) Int. Cl.
  *B64D 15/20* (2006.01)
  *B64D 15/00* (2006.01)
  *B64D 15/22* (2006.01)

(52) U.S. Cl.
  CPC ...................... *B64D 15/22* (2013.01)

(58) Field of Classification Search
  CPC ........ B64D 15/00; B64D 15/14; B64D 15/20; B64D 15/22; G08B 19/02; G06F 19/00
  USPC ............... 340/580, 582, 602, 962; 73/170.02, 73/170.26; 244/134 R, 134 F; 702/3, 54
  See application file for complete search history.

(56) References Cited

U.S. PATENT DOCUMENTS

| | | | | |
|---|---|---|---|---|
| 6,560,551 | B1 * | 5/2003 | Severson | B64D 15/22 340/582 |
| 7,984,647 | B2 * | 7/2011 | Severson | G08B 19/02 73/170.26 |
| 2010/0206991 | A1 * | 8/2010 | Severson | G08B 19/02 244/134 F |
| 2011/0297789 | A1 * | 12/2011 | Gallman | B64D 15/14 244/134 R |
| 2013/0103317 | A1 | 4/2013 | Ray et al. | |
| 2013/0175396 | A1 | 7/2013 | Meis et al. | |
| 2013/0175397 | A1 | 7/2013 | Meis et al. | |
| 2013/0240672 | A1 | 9/2013 | Meis | |
| 2013/0327756 | A1 | 12/2013 | Clemen, Jr. et al. | |

* cited by examiner

*Primary Examiner* — Hung T Nguyen
(74) *Attorney, Agent, or Firm* — Womble Carlyle Sandridge & Rice LLP

(57) ABSTRACT

A method is provided that includes a number of operations performed in real-time during flight of the aircraft. That is, the method may include monitoring a continuous electrical signal output by a sensor on a surface of the aircraft, where a magnitude of the electrical signal may be related to an amount of ice buildup. The method may include calculating a liquid water content (LWC) value as a function of a rate of change of the electrical signal, and iteratively calculating a total water exposure (TWE) value as a function of the LWC value. The TWE value may represent a total water exposure of the aircraft from a time of an initial event, and may be calculated as a running total over a plurality of iterations. And the method may include performing a remedial or alert action in an instance in which the TWE value reaches a TWE threshold.

21 Claims, 5 Drawing Sheets

DETECTING INFLIGHT ICING CONDITIONS ON AIRCRAFT

TECHNOLOGICAL FIELD

The present disclosure relates generally to detecting icing conditions and, in particular, to detecting inflight icing conditions on aircraft.

BACKGROUND

In aviation, icing on an aircraft may occur when the atmospheric conditions lead to the formation of ice on the surfaces or within the engine of the aircraft, which is often undesirable and potentially unsafe for operating the aircraft. FAA regulations define atmospheric envelopes in which icing conditions must be considered for aircraft design and certification. Given that even a small amount of ice accumulation on the leading edge of an aircraft wing can have significant impacts on lift and drag characteristics, the real-time detection of aircraft icing is an important flight deck input needed to ensure safe flight.

Many aircraft include systems to handle these icing conditions, including real-time ice detection systems. These systems vary between aircraft, but many commercial transport-category aircraft utilize ice detection sensors capable of detecting aircraft icing conditions and alerting the flight crew in appropriate situations. Existing ice detection sensors use various technologies, but most aircraft presently use an ice accretion sensor that includes a vibrating probe designed to collect supercooled water droplets on the probe surface. These sensor probes have limitations in terms of slow reaction time, and limited ability to detect all droplet sizes and temperature/liquid water content conditions with certain icing envelopes. These limitations may not only impact the ability of the ice detection system to efficiently operate to handle icing conditions, but may also lead to less-than-optimum fuel consumption.

Therefore, it may be desirable to have a system and method that takes into account at least some of the issues discussed above, as well as possibly other issues.

BRIEF SUMMARY

Example implementations of the present disclosure are generally directed to an improved apparatus, method and computer-readable storage medium for detecting an inflight icing condition on an aircraft. Example implementations may detect an icing condition based on part on the rate of ice encountered by the aircraft, and may do so by monitoring a continuous electrical signal output by a sensor on a surface of the aircraft, as opposed to waiting for a discrete signal that the sensor is configured to output to indicate a particular amount of ice buildup. In some instances, the system, method and computer-readable storage medium may use variable thresholds for performing alert or remedial actions in response to an icing condition having been detected. This may allow different thresholds for different actions, and may also allow for variability in aircraft or flight phase. The actions may include activation of different ice protection systems, and by their activation in response to different thresholds, example implementations may reduce fuel consumption of the aircraft.

According to one aspect of example implementations, the method includes a number of operations performed in real-time during flight of the aircraft. That is, the method may include monitoring a continuous electrical signal output by a sensor on a surface of the aircraft, where a magnitude of the electrical signal may be related to an amount of ice buildup on the sensor. The method may include calculating a liquid water content (LWC) value as a function of a rate of change of the electrical signal, and iteratively calculating a total water exposure (TWE) value as a function of the LWC value. The TWE value may represent a total water exposure of the aircraft from a time of an initial event, and may be calculated as a running total over a plurality of iterations. And the method may include performing a remedial or alert action in an instance in which the TWE value reaches a TWE threshold.

In some examples, the continuous electrical signal is distinct from any discrete signal that the sensor is configured to output to indicate a particular amount of ice buildup on the sensor.

In some examples, the sensor may be an ice accretion sensor including a magnetostrictive probe whose vibrational frequency is measurable in terms of a continuous electrical voltage signal output by the ice accretion sensor. In these examples, monitoring the continuous electrical signal may include monitoring the continuous electrical voltage signal output by the ice accretion sensor.

In some examples, the method may further include monitoring one or more aircraft flight parameters including at least true airspeed of the aircraft. In these examples, calculating the TWE value may include calculating the TWE value further as a function of the one or more aircraft flight parameters.

In some examples, performing the remedial or alert action includes causing activation of an ice protection system onboard the aircraft. This ice protection system may include, for example, a wing anti-icing system, an engine inlet anti-icing system, a wing deicing system or an empennage deicing system. And in some further examples, performing the remedial or alert action may include causing activation of a first ice protection system in an instance in which the TWE value reaches a first TWE threshold, and causing activation of a different, second ice protection system in an instance in which the TWE value reaches a different, second TWE threshold.

In other aspects of example implementations, an apparatus and a computer-readable storage medium are provided for detecting an inflight icing condition on an aircraft. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
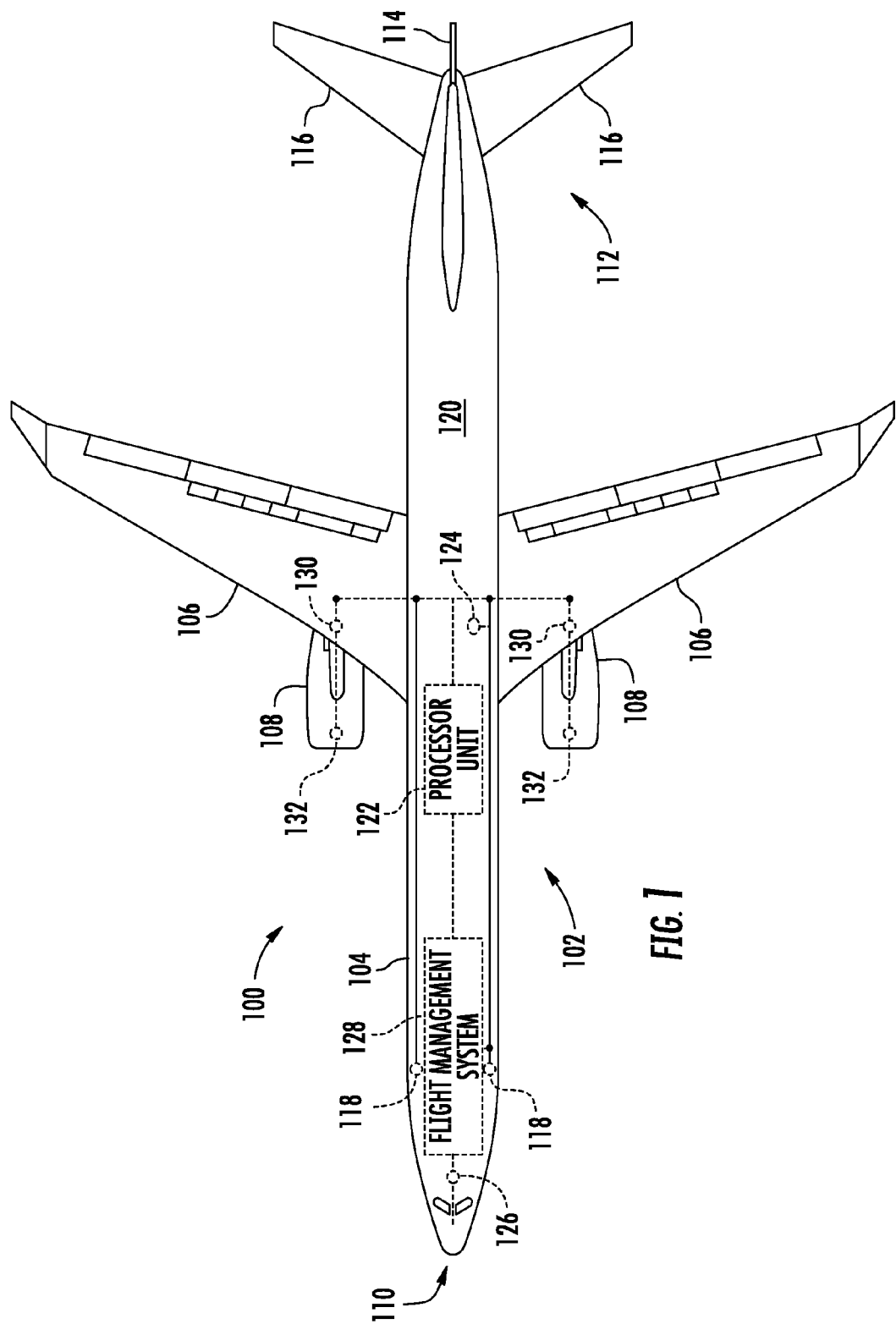
FIG. 1 is an illustration of an aircraft equipped with an icing detection system, in accordance with example implementations of the present disclosure.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. Also, something may be shown or described as being to a first, second, third or the like should not be taken to imply a specific order, unless otherwise stated. Further, although reference may be made herein to a number of measures, thresholds and the like such as times, distances, speeds, percentages and the like, according to which aspects of example implementations may operate; unless stated otherwise, any or all of the measures/thresholds may be configurable. Like reference numerals refer to like elements throughout.

FIG. 1 illustrates an aircraft 100 equipped with an icing detection system 102, in accordance with example implementations of the present disclosure. As shown, the aircraft is a commercial, twin-engine aircraft. It should be understood, however, that other types of aircraft including fixed-wing aircraft and rotorcraft, commercial and military aircraft, and the like may be equally equipped with the system of example implementations.

The aircraft 100 includes a fuselage 104 to which a pair of wings 106 are attached extend; and the aircraft includes a pair of engines 108 attached to the wings. The fuselage has a nose section 110 at the forward part of the aircraft, and a tail section 112 at the aft part of the aircraft. A vertical stabilizer 114 and a pair of horizontal stabilizers 116 are attached to the tail section of the fuselage.

The icing detection system 102 includes one or more of each of a number of components such as a sensor 118 at a location on the surface of the aircraft 120, and coupled to a processor unit 122. As shown, the sensor includes a pair of sensors on opposing sides of the fuselage. It should be understood that the sensor may be at other locations on the aircraft, and may include a single sensor or more than a pair of sensors. A temperature sensor 124 is also depicted in addition to sensor 118.

The sensor 118 may be any of a number of different types of sensors configured to detect or otherwise measure the presence of water or ice in real-time during flight of the aircraft 100. In some examples, the sensor may be configured to measure the presence of supercooled liquid water in a cloud and output an appropriate continuous electrical signal (e.g., analog signal) response. Examples of suitable sensors include an ice accretion sensor such as a magnetostrictive probe ice accretion sensor, piezoelectric, flush-mounted ice accretion sensor or optical ice accretion sensor, a hot-wire anemometer and the like. The sensor may be a commercial-off-the-shelf (COTS) sensor, custom sensor, or COTS sensor customized to operate in accordance with example implementations of the present disclosure.

As described in greater detail for purposes of illustration, the sensor 118 in some examples may be a COTS ice accretion sensor that includes a magnetostrictive probe whose vibrational frequency is measurable in terms of a continuous electrical voltage signal (e.g., in the range of 0 to 5 VDC) output by the ice accretion sensor. This sensor may be customized to output the continuous electrical voltage signal to the processor unit 122, in addition to or in lieu of any distinct, discrete or digital signal that may be output by the sensor to indicate a particular amount of ice buildup on the sensor. This sensor may also include internal heating circuits configured to deice the probe and other sensor elements in instances in which the vibrational frequency of the probe is at or over a frequency threshold.

In accordance with example implementations, the processor unit 122 may be configured to detect an icing condition of the aircraft 100 and perform one or more actions in response thereto, in real-time (real-time generally herein including near real-time) during flight of the aircraft 100. That is, the processor unit may monitor the continuous output electrical signal (e.g., output voltage) from the sensor 118, and calculate a value of supercooled liquid water content (LWC) through which the aircraft 100 is flying, as a function of a rate of change of the electrical signal. In some examples, this calculation may be made through a known relationship between the magnitude of the electrical signal and the LWC, which may be reflected in a number of manners such as by an algorithm, or in a database, lookup table or the like.

In some examples, the LWC calculation may be further a function of one or more aircraft flight parameters. In this regard, in addition to the output electrical signal from the sensor 118, the processor unit 122 may be configured to monitor various aircraft flight parameters, such as aircraft-on-ground condition, Mach number, true airspeed, total air temperature, ambient temperature, aircraft flight surfaces temperatures and the like. In some examples, the processor unit may monitor an aircraft data bus for one or more of these aircraft flight parameters. In another example, the total air temperature may be obtained from the temperature sensor 124.

The processor unit 122 may calculate a total water exposure (TWE) value (or simply TWE) as a function of the LWC value (or simply LWC), and perhaps one or more of these additional flight parameters. This TWE may represent the total water exposure of the aircraft 100 from a time of an initial event, such as the time the aircraft has flown in a current icing cloud environment. And the processor unit may utilize this TWE to make various logic decisions by comparison to one or more TWE thresholds at or over which the processor unit may perform one or more actions, as described in greater detail below.

Figure 2:
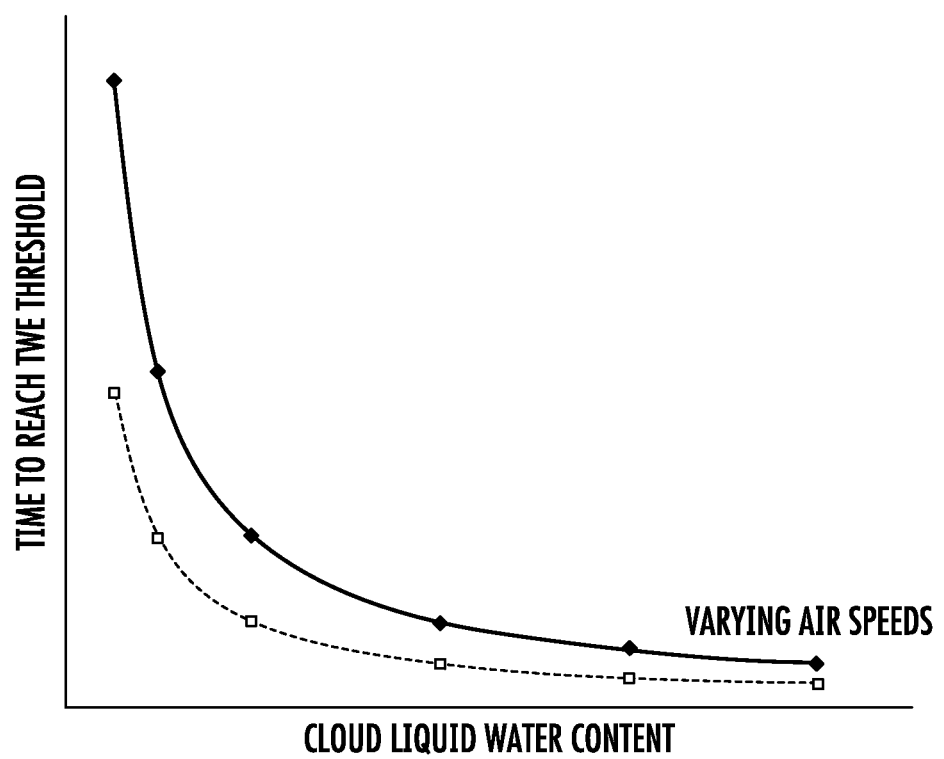
FIG. 2 illustrates a typical plot comparing supercooled liquid water content, as measured in a cloud, to the time of annunciation that may be required by an icing detection system to measure a given threshold value of TWE, for two different airspeeds, according to example implementations.

FIG. 2 illustrates a typical plot comparing supercooled LWC, as measured in a cloud, to the time of annunciation that may be required by the icing detection system 102 to measure a given threshold value of TWE, for two different airspeeds. As the speed of the aircraft 100 increases, or as the intensity of the LWC in the cloud increases, the time to detect a given TWE threshold decreases. In other words, the faster the rate of ice accretion, the sooner the icing detection system may reach a particular threshold and perform an appropriate alert or remedial action. Because of the flexibility of this approach, the processor unit 122 may be configured to account for additional aircraft flight parameters (e.g., aircraft-on-ground condition, Mach number, true airspeed, total air temperature, ambient temperature, aircraft flight surfaces temperatures), since these parameters may impact the rate at which ice may accrete on the sensor 118 and hence, the aircraft itself.

Returning to FIG. 1, the processor unit 122 may be configured to perform one or more alert or remedial actions in response to the TWE being at or greater than each of one or more TWE thresholds. As described below, for example, the processor unit may generate an alert, generate a log entry, send a report, cause activation of one or more ice protection systems, and/or perform another appropriate action.

The processor unit 122 may generate an alert on a flight deck interface 126 of the aircraft 100. The flight deck interface is a display system located in the flight deck of the aircraft, and includes a number of displays on which information may be displayed to operators. These displays are hardware devices in the illustrative examples, and may include, for example, a primary flight display, a navigation display, and other suitable types of displays.

Additionally or alternatively, the processor unit 122 may generate a log entry in or send a report to a flight management system 128 of the aircraft 100, and/or send a report to a remote location. The flight management system is a computer system in the aircraft that includes a number of computers. When more than one computer is present in the computer system, those computers may be in communication with each other using communications media, such as a local area network.

Additionally or alternatively, the processor unit 122 may cause activation of one or more ice protection systems (e.g., anti-icing systems, deicing systems) onboard the aircraft 100. These systems may be deployed throughout the aircraft and employ various different types of mechanisms to remove or prevent the formation of ice on its surface 120. As shown, for example, these systems may include a wing anti-icing system 130 and an engine inlet anti-icing system 132. Other examples of suitable ice protection systems include a wing deicing system, an empennage deicing system and the like.

In some examples, the processor unit 122 may perform an action in response to the TWE being at or greater than a TWE threshold, and then perform an associated, opposite action in response to the TWE decreasing to below the TWE threshold. This may be the case, for example, in instances in which the TWE activates and then later deactivates an ice protection system.

In some examples, the processor unit 122 may perform different actions in response to the TWE being at or greater than different TWE thresholds. That is, the processor unit may perform a first action in response to the TWE being at or greater than a first TWE threshold, and perform a second action in response to the TWE being at or greater than a second TWE threshold (and perhaps perform a third action for a third TWE threshold, and so on). As described in greater detail below, this may allow the processor unit to cause activation of different ice protection systems in response to the TWE reaching different TWE thresholds. It may also allow the processor unit to account for other characteristics of the aircraft 100 or flight by setting TWE thresholds that may depend, for example, on the aircraft or flight phase where velocity and temperature regimes may be different.

Figure 3:
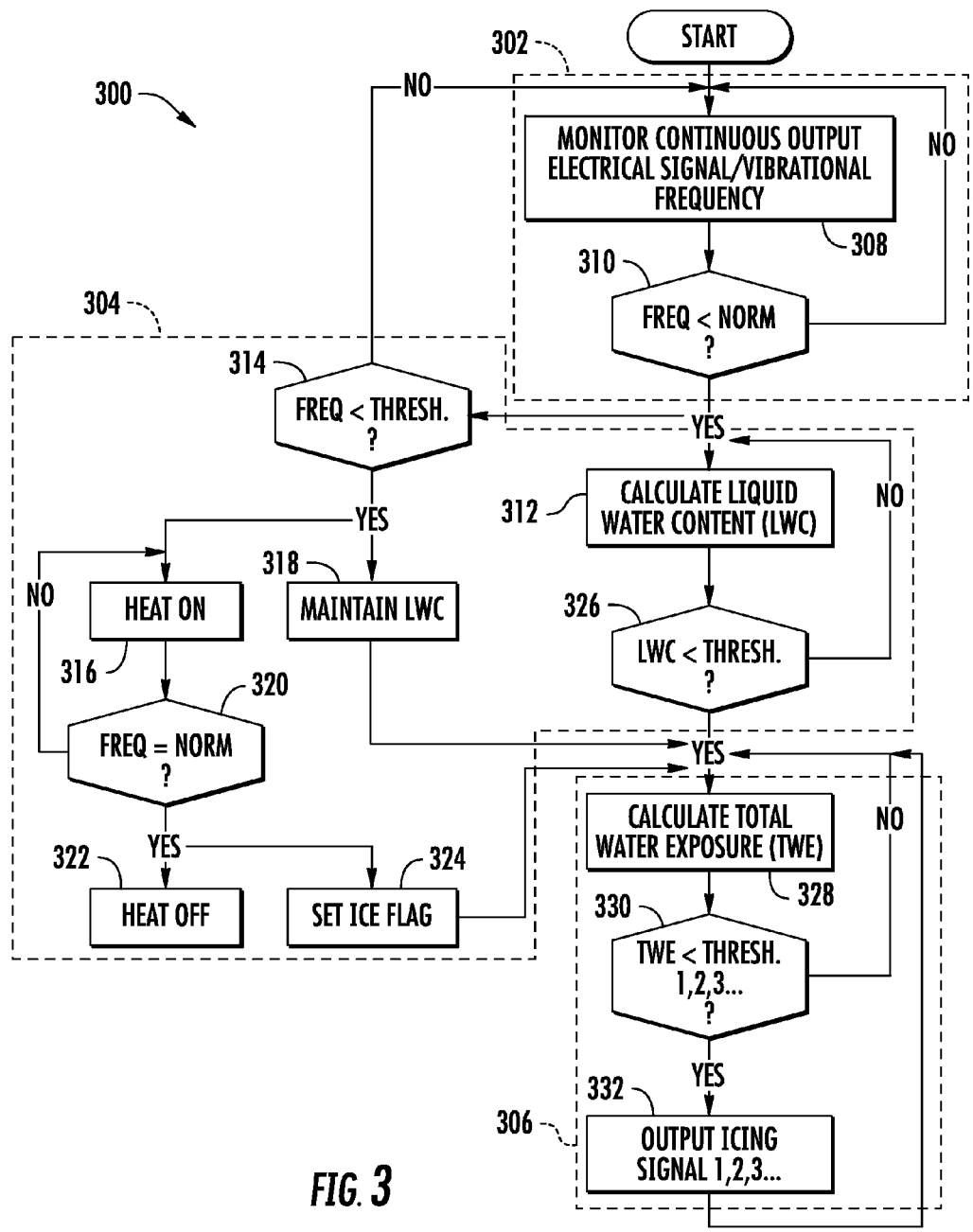
FIG. 3 illustrates a flowchart including various operations in a method according to one example implementation.

FIG. 3 illustrates a flowchart including various operations in a method 300 according to one example implementation of the present disclosure. The method is shown and described in the context of the sensor 118 being a magnetostrictive probe ice accretion sensor such as that described above, but it should be understood that the method may be equally applicable in the context of a number of other different types of sensors. As shown, the method may include first, second and third aspects 302, 304, 306, each of which may include one or more operations performed continuously in real-time during flight of the aircraft 100.

The first aspect 302 of the method 300 may include monitoring the vibrational frequency of the sensor's probe, such as by internal circuitry of the sensor, as shown in block 308. A decrease in this frequency may indicate a buildup of ice on the probe. In this regard, the sensor may have a nominal or normal vibration frequency during flight of the aircraft, and as ice builds up on the probe, the frequency may decrease below the normal frequency, as shown in block 310. This may then lead into the second aspect 304 of the method.

Also in the first aspect 302 and into the second aspect 304, the method may include the processor unit 122 monitoring the continuous output electrical signal (e.g., output voltage) from the sensor 118, as also shown in block 308. Then when the frequency decreases below the normal frequency (block 310), the processor unit may iteratively calculate the supercooled LWC through which the aircraft 100 is flying, and the LWC may be calculated based on the output electrical signal, as shown in block 312.

In some examples, the processor unit 122 may calculate the LWC as the output voltage rate of change for the sensor probe (which is an indication of the frequency shift), divided by the product of aircraft speed (true air speed) and collection efficiency of the sensor probe. LWC may be calculated in grams/cubic meter, and may include one or more unit conversions in its calculation. Written notationally, the LWC at an iteration i in some examples may be calculated as follows:

$$LWC_i = (K_1 \times ISdt)/(TAS \times Coeff)$$

In the preceding, $K_1$ represents a probe calibration constant, ISdt (e.g., volts/sec) represents a derivative or rate of change of the output electrical signal from the sensor 118, TAS (e.g., knots) represents the true air speed of the aircraft, and Coeff represents a collection efficiency of the probe.

Also in the second aspect 304 of the method 300, the internal circuitry of the sensor 118 may continue to monitor the probe's vibrational frequency until it reaches a frequency threshold that indicates a certain thickness of ice to indicate an icing condition, as shown in block 314. For example, the normal frequency may be 50 KHz, and a decrease in frequency of 5% may be a frequency threshold that indicates, for example, 0.1 inch of ice accretion on the sensor probe. At this time, an internal heating circuit ("heater") of the sensor may be turned on to deice the sensor's probe, as shown in block 316. While the heater is on, the frequency of the sensor's probe may change (increase back to normal), but the processor unit 122 may maintain the LWC at its most recent value, so an ongoing TWE calculation may continue (since the icing condition is continuing while the sensor's probe is deiced), as shown at block 318.

Deicing the sensor's probe may return its vibrational frequency to normal once the ice melts, and the heater may be turned off, as shown in blocks 320, 322. At this point, if the icing condition persists, the frequency may start to decrease again. Also at this point, an ice flag may be set to provide an internal indication that an icing condition exists, as shown in block 324. This combined with the LWC hitting a particular LWC threshold indicating the icing condition is above the sensor's noise floor, as shown in block 326, may lead into the method's third aspect 306 during which the TWE may be calculated and action(s) may be performed based on the calculated TWE. This stability of the icing condition may be indicated, for example, when the calculated LWC remains at substantially the same value (e.g., 0.1 grams/meter) for at least a certain period of time (e.g., 10 seconds), and at that point, the icing condition may be considered stable.

Setting the ice flag may not affect the actual value of TWE, but may be instead tied into the time that the processor unit 122 calculates the TWE such that after icing conditions end, the flag may be reset or incremented to a new value once icing is later, again encountered. Here, the end of the icing condition may be reflected by the TWE being substantially unchanged for a given time period (as indicated by a steady decrease in LWC). In this manner, different ice protection systems may be activated at various different TWE levels.

In the third aspect 306, the method 300 may include the processor unit 122 iteratively calculating the TWE based on the rate of change or integration of the calculated LWC, as shown in block 328. In some examples, this calculation may be performed iteratively as a running total until the ice flag is reset or incremented. The TWE may be calculated in any of a number of different manners. For example, the TWE may be calculated as the sum of a prior-calculated TWE and product of the current real-time LWC, the aircraft speed (true air speed) and an iteration rate (number of LWC measurement samples per second, for example). TWE may be calculated in kilograms/square meter, and may include one or more unit conversions in its calculation. Written notationally, the TWE at iteration i in some examples may be calculated as follows:

$$TWE_i = TWE_{i-1} + (TAS \times LWC_i \times K_2 \times iRate)$$

In the preceding, $TWE_{i-1}$ represents the calculated TWE at prior iteration i−1, $K_2$ represents a unit conversion, and iRate represents an iteration rate (e.g., samples per second) for the TWE calculation. And again, TAS (e.g., knots) represents the true air speed of the aircraft 100, and $LWC_i$ represents the liquid water content at iteration i.

Also in the third aspect 306, the method may include 300 the processor unit 122 monitoring the calculated TWE until it reaches one or more TWE thresholds for respective one or more aircraft systems that may need their ice protection systems activated, as shown in block 330. The method may then include the processor unit outputting icing signals to the appropriate ice protection systems to activate them, as shown in block 332. As described above, these ice protection systems may include a wing anti-icing system 130, engine inlet anti-icing system 132, wing deicing system, empennage deicing system and the like.

In some examples, there may be multiple unique TWE thresholds, or TWE thresholds that are multiples of one another (e.g., x, 5x, 10x). The TWE threshold(s) may be selected in any of a number of different manners such as based on individual design criteria for the aircraft. This may include, for example, aerodynamic data on lift or drag characteristics relative to contamination by ice or engine limits to prevent damage from ice ingestion. For example, a first TWE threshold may be set at 10 kilograms/square meter, and may be for activation of the wing anti-icing system 130. A second TWE threshold may be set at 20 kilograms/square meter, and may be for activation of engine inlet anti-icing system 132. And a third TWE threshold may be set at 30 kilograms/square meter, and may be for activation of an empennage deicing system.

Figure 4:
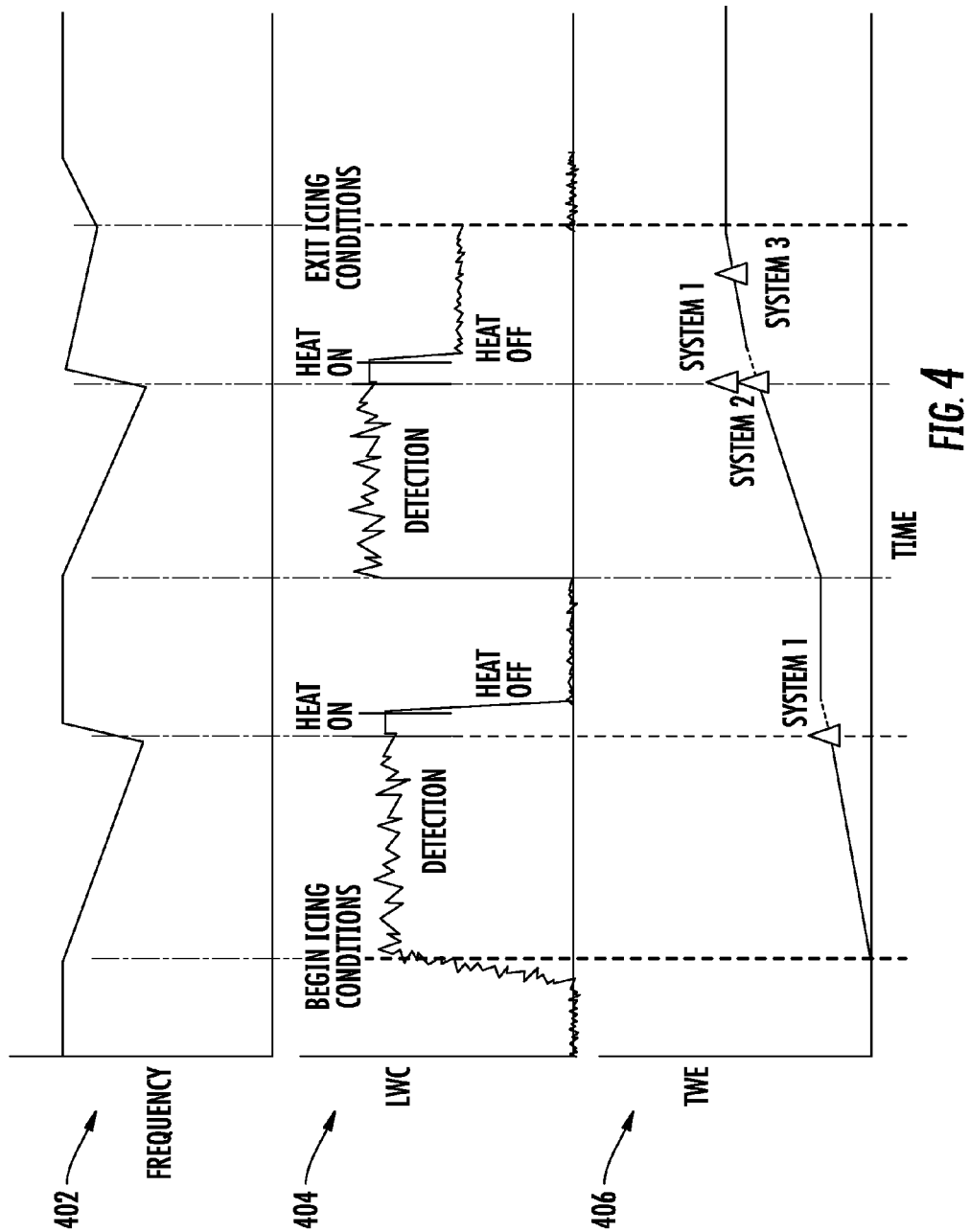
FIG. 4 illustrates first, second and third timing diagrams for respective first, second and third aspects of the method of FIG. 3, according to one example implementation.

FIG. 4 illustrates first, second and third timing diagrams 402, 404, 406 for respective first, second and third aspects 302, 304, 306 of the method 300 of FIG. 3. As shown in the first timing diagram, when an icing condition is encountered and ice accretion occurs on the sensor 118 or more particularly its probe, the vibrational frequency of the probe decreases. When the sensor is heated and the ice melts, the frequency increases back to normal. The cycle repeats so long as the icing condition persists.

As shown in the second diagram 404 for the second aspect 304 of the method 300, when the sensor's frequency decreases, the calculated LWC begins to increase, based on the continuous output electrical signal (e.g., output voltage) from the sensor 118. This may continue until the LWC hits a LWC threshold, at which point LWC may be consistent enough to begin calculating TWE. When the sensor's frequency threshold is reached and the heat is turned on, the LWC value may be maintained constant until the sensor's frequency is back to normal. When the frequency again decreases due to ice accretion, the LWC calculations may continue.

As shown in the third diagram 406 for the third aspect 306, when the calculated LWC values are consistent, the TWE may be calculated. As the calculated TWE increases, it eventually reaches a first TWE threshold for activation of a first ice protection system. When the sensor heat is on and the calculated LWC is held constant, the calculated TWE may continue to increase at a constant rate based on the last value of LWC. The TWE may continue to be calculated and increase until all TWE thresholds have been reached and signals transmitted to the appropriate ice protection systems, unless icing conditions end (indicated by an increase in sensor frequency or no change in sensor frequency for a period of time). In this case, the ice flag may be reset or incremented, and a gradual decrease in TWE may be calculated based on time out of natural icing conditions.

According to example implementations of the present disclosure, the processor unit 122 may be implemented by hardware, alone or under direction of one or more computer program code instructions, program instructions or executable computer-readable program code instructions from a computer-readable storage medium. In one example, one or more apparatuses may be provided that are configured to function as or otherwise implement the processor unit shown and described herein. In examples involving more than one apparatus, the respective apparatuses may be connected to or otherwise in communication with one another in a number of different manners, such as directly or indirectly via a wireline or wireless network or the like.

Figure 5:
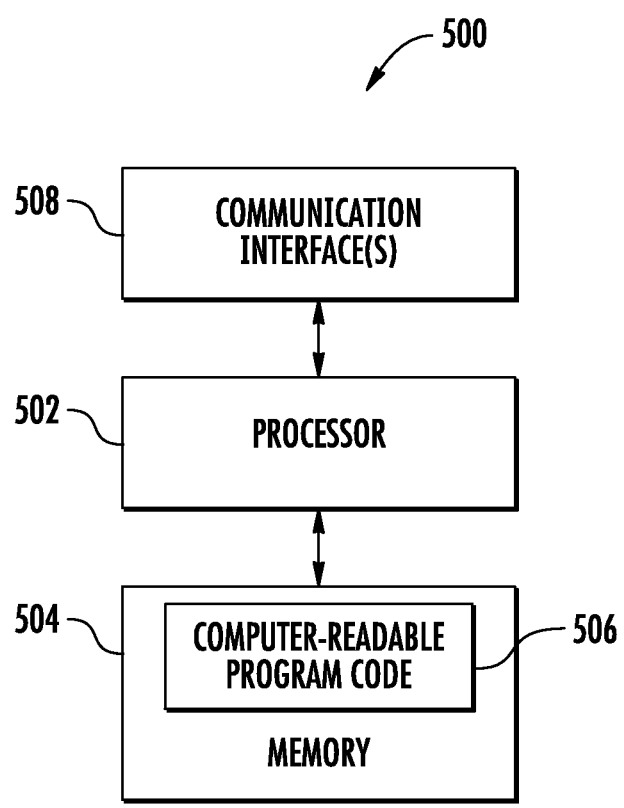
FIG. 5 illustrates an apparatus that according to some examples may be configured to at least partially implement a processor unit.

FIG. 5 illustrates an apparatus 500 that according to some examples may be configured to at least partially implement the processor unit 122. Generally, the apparatus of exemplary implementations of the present disclosure may comprise, include or be embodied in one or more fixed, portable or embedded electronic devices. The apparatus may include one or more of each of a number of components such as, for example, a processor 502 connected to a memory 504.

The processor 502 is generally any piece of computer hardware that is capable of processing information such as, for example, data, computer-readable program code, instructions or the like (at times generally referred to as "computer programs," e.g., software, firmware, etc.), and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 504 (of the same or another apparatus).

The processor 502 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 504 is generally any piece of computer hardware that is capable of storing information such as, for example, data, computer programs (e.g., computer-readable program code 506) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disc-read only memory (CD-ROM), compact disc-read/write (CD-R/W), digital versatile disc (DVD) or other standard media and format. In various instances, the memory may be referred to as a computer-readable storage medium which, as a non-transitory device capable of storing information, may be distinguishable from computer-readable transmission media such as electronic transitory signals capable of carrying information from one location to another. Computer-readable medium as described herein may generally refer to a computer-readable storage medium or computer-readable transmission medium.

In addition to the memory 504, the processor 502 may also be connected to one or more interfaces for displaying, transmitting and/or receiving information. The interfaces may include a communications interface 508 (e.g., communications unit). The communications interface may be configured to transmit and/or receive information, such as to and/or from other apparatus(es), network(s) or the like. The communications interface may be configured to transmit and/or receive information by physical (wireline) and/or wireless communications links. Examples of suitable communication interfaces include a network interface controller (NIC), wireless NIC (WNIC) or the like.

As indicated above, program code instructions may be stored in memory, and executed by a processor, to implement functions of the systems, subsystems and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 500 may include a processor 502 and a computer-readable storage medium or memory 504 coupled to the processor, where the processor is configured to execute computer-readable program code 506 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for detecting an inflight icing condition on an aircraft, the apparatus comprising:
    a processor; and
    a computer-readable storage medium coupled to the processor and having computer-readable program code stored therein that, in response to execution by the processor, causes the apparatus to perform a number of operations in real-time during flight of the aircraft, including the apparatus being caused to at least:
    monitor a continuous electrical signal output by a sensor on a surface of the aircraft, a magnitude of the electrical signal being related to an amount of ice buildup on the sensor;
    calculate a liquid water content (LWC) value as a function of a rate of change of the electrical signal;
    iteratively calculate a total water exposure (TWE) value as a function of the LWC value, the TWE value representing a total water exposure of the aircraft from a time of an initial event, and being calculated as a running total over a plurality of iterations; and
    perform a remedial or alert action in an instance in which the TWE value reaches a TWE threshold.

2. The apparatus of claim 1, wherein the continuous electrical signal is distinct from any discrete signal that the sensor is configured to output to indicate a particular amount of ice buildup on the sensor.

3. The apparatus of claim 1, wherein the sensor comprises an ice accretion sensor including a magnetostrictive probe whose vibrational frequency is measurable in terms of a continuous electrical voltage signal output by the ice accretion sensor, and wherein the apparatus being caused to monitor the continuous electrical signal includes being caused to monitor the continuous electrical voltage signal output by the ice accretion sensor.

4. The apparatus of claim 1, wherein the computer-readable storage medium has further computer-readable program code stored therein that, in response to execution by the processor, causes the apparatus to further at least:

monitor one or more aircraft flight parameters including at least true airspeed of the aircraft, and wherein the apparatus being caused to calculate the TWE value includes being caused to calculate the TWE value further as a function of the one or more aircraft flight parameters.

5. The apparatus of claim 1, wherein the apparatus being caused to perform the remedial or alert action includes the apparatus being caused to cause activation of an ice protection system onboard the aircraft.

6. The apparatus of claim 5, wherein the ice protection system includes a wing anti-icing system, an engine inlet anti-icing system, a wing deicing system or an empennage deicing system.

7. The apparatus of claim 5, wherein the apparatus being caused to perform the remedial or alert action includes the apparatus being caused to cause activation of a first ice protection system in an instance in which the TWE value reaches a first TWE threshold, and cause activation of a different, second ice protection system in an instance in which the TWE value reaches a different, second TWE threshold.

8. A method of detecting an inflight icing condition on an aircraft, the method comprising a number of operations performed in real-time during flight of the aircraft, including:

monitoring a continuous electrical signal output by a sensor on a surface of the aircraft, a magnitude of the electrical signal being related to an amount of ice buildup on the sensor;

calculating a liquid water content (LWC) value as a function of a rate of change of the electrical signal;

iteratively calculating a total water exposure (TWE) value as a function of the LWC value, the TWE value representing a total water exposure of the aircraft from a time of an initial event, and being calculated as a running total over a plurality of iterations; and performing a remedial or alert action in an instance in which the TWE value reaches a TWE threshold.

9. The method of claim 8, wherein the continuous electrical signal is distinct from any discrete signal that the sensor is configured to output to indicate a particular amount of ice buildup on the sensor.

10. The method of claim 8, wherein the sensor comprises an ice accretion sensor including a magnetostrictive probe whose vibrational frequency is measurable in terms of a continuous electrical voltage signal output by the ice accretion sensor, and wherein monitoring the continuous electrical signal includes monitoring the continuous electrical voltage signal output by the ice accretion sensor.

11. The method of claim 8 further comprising:

monitoring one or more aircraft flight parameters including at least true airspeed of the aircraft, and wherein calculating the TWE value includes calculating the TWE value further as a function of the one or more aircraft flight parameters.

12. The method of claim 8, wherein performing the remedial or alert action includes causing activation of an ice protection system onboard the aircraft.

13. The method of claim 12, wherein the ice protection system includes a wing anti-icing system, an engine inlet anti-icing system, a wing deicing system or an empennage deicing system.

14. The method of claim 12, wherein performing the remedial or alert action includes causing activation of a first ice protection system in an instance in which the TWE value reaches a first TWE threshold, and causing activation of a different, second ice protection system in an instance in which the TWE value reaches a different, second TWE threshold.

15. A computer-readable storage medium for detecting an inflight icing condition on an aircraft, the computer-readable storage medium being non-transitory and having computer-readable program code stored therein that, in response to execution by a processor, cause an apparatus to perform a number of operations in real-time during flight of the aircraft, including the apparatus being caused to at least:

monitor a continuous electrical signal output by a sensor on a surface of the aircraft, a magnitude of the electrical signal being related to an amount of ice buildup on the sensor;

calculate a liquid water content (LWC) value as a function of a rate of change of the electrical signal;

iteratively calculate a total water exposure (TWE) value as a function of the LWC value, the TWE value representing a total water exposure of the aircraft from a time of an initial event, and being calculated as a running total over a plurality of iterations; and perform a remedial or alert action in an instance in which the TWE value reaches a TWE threshold.

16. The computer-readable storage medium of claim 15, wherein the continuous electrical signal is distinct from any discrete signal that the sensor is configured to output to indicate a particular amount of ice buildup on the sensor.

17. The computer-readable storage medium of claim 15, wherein the sensor comprises an ice accretion sensor including a magnetostrictive probe whose vibrational frequency is measurable in terms of a continuous electrical voltage signal output by the ice accretion sensor, and wherein the apparatus being caused to monitor the continuous electrical signal includes being caused to monitor the continuous electrical voltage signal output by the ice accretion sensor.

18. The computer-readable storage medium of claim 15, wherein the computer-readable storage medium has further computer-readable program code stored therein that, in response to execution by the processor, causes the apparatus to further at least:

monitor one or more aircraft flight parameters including at least true airspeed of the aircraft, and wherein the apparatus being caused to calculate the TWE value includes being caused to calculate the TWE value further as a function of the one or more aircraft flight parameters.

19. The computer-readable storage medium of claim 15, wherein the apparatus being caused to perform the remedial or alert action includes the apparatus being caused to cause activation of an ice protection system onboard the aircraft.

20. The computer-readable storage medium of claim 19, wherein the ice protection system includes a wing anti-icing system, an engine inlet anti-icing system, a wing deicing system or an empennage deicing system.

21. The computer-readable storage medium of claim 19, wherein the apparatus being caused to perform the remedial or alert action includes the apparatus being caused to cause activation of a first ice protection system in an instance in which the TWE value reaches a first TWE threshold, and cause activation of a different, second ice protection system in an instance in which the TWE value reaches a different, second TWE threshold.

* * * * *